(12) United States Patent
Hsu

(10) Patent No.: US 6,197,152 B1
(45) Date of Patent: *Mar. 6, 2001

(54) PROCESS AND APPARATUS FOR RECOVERY OF LITHIUM IN A HELMINTHOID EVAPORATOR

(75) Inventor: Kenneth J. Hsu, Zurich (CH)

(73) Assignee: Tarim Associates for Scientific Mineral & Oil Exploration AG, Zurich (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,092

(22) Filed: Apr. 18, 1997

Related U.S. Application Data

(63) Continuation-in-part of application No. 08/503,587, filed on Jul. 18, 1995, now abandoned.

(51) Int. Cl.[7] .............................. B01D 1/14; C01D 15/00
(52) U.S. Cl. ........................... 159/47.1; 23/306; 159/23; 159/29; 159/903; 423/179.5
(58) Field of Search .............................. 159/47.1, 15, 45, 159/903, 29, 23; 23/306; 203/DIG. 1; 202/234, 235; 196/111; 423/179.5, 184, 158, 179

(56) References Cited

U.S. PATENT DOCUMENTS

| | | | | |
|---|---|---|---|---|
| 496,615 | * | 5/1893 | Monsanto | 159/15 |
| 3,607,670 | * | 9/1971 | King | 203/100 |
| 3,615,259 | * | 10/1971 | Neitzel | 23/298 |
| 3,725,271 | * | 4/1973 | Giannotti | 159/13 |
| 3,791,934 | * | 2/1974 | Webb | 202/173 |
| 3,879,215 | * | 4/1975 | De Villiers et al. | 159/28 |
| 3,918,916 | * | 11/1975 | Garrett | 159/45 |
| 4,088,451 | * | 5/1978 | Sadan | 159/15 |
| 4,133,183 | * | 1/1979 | Albertson | 62/2 |
| 4,210,421 | * | 7/1980 | Dahms | 159/45 |
| 4,224,035 | * | 9/1980 | Geesen | 23/296 |
| 4,243,392 | * | 1/1981 | Brown et al. | 23/302 R |
| 4,341,752 | * | 7/1982 | Groenhof | 423/497 |
| 4,723,962 | * | 2/1988 | Mehta | 23/302 R |
| 4,804,477 | * | 2/1989 | Allen et al. | 210/737 |
| 4,863,567 | * | 9/1989 | Raley | 202/182 |
| 5,395,483 | * | 3/1995 | Al-Hawaj | 202/173 |

\* cited by examiner

Primary Examiner—Virginia Manoharan
(74) Attorney, Agent, or Firm—Helfgott & Karas, P.C.

(57) ABSTRACT

A process and apparatus for continuously removing soluble minor constituents from brines containing soluble major and minor constituents by use of a Helminthoid evaporator.

7 Claims, 1 Drawing Sheet

PROCESS AND APPARATUS FOR RECOVERY OF LITHIUM IN A HELMINTHOID EVAPORATOR

This application is a continuation-in-part of 08/503,587, filed Jul. 18, 1995, abandoned.

BACKGROUND OF THE INVENTION

The present invention is directed to a process for recovery of lithium and other minor constituents from salt water bodies.

Valuable metals and salts are found in nature as dissolved ions in brine. Methods for recovery of minor constituents in such brines generally concentrate such constituents through evaporation of the brine. The concentration of the minor constituents can be effected either through chemical precipitation of the major constituents as described in U.S. Pat. No. 4,271,131 or by physical precipitation of the major constituents and separation of such precipitates from a brine which is rich in the minor constituents.

Recovery of commercially valuable compounds such as table salt (halite NaCl), potassium fertilizer (sylvite KCl) and the like from natural brines from the ocean, salt lakes, or underground by fractional crystallization where salts of successively lower solubility are precipitated in successive ponds is known. Chloride brines obtained from the Qaidam Basin of northwest China or from the Dead Sea for example, contain mainly sodium, potassium and magnesium ions. Fractionation by solar evaporation is carried out to precipitate halite, carnallite and bischoffite in successive ponds.

The oldest commercial process for recovery of lithium is by mining minerals such as those found in pegmatite, and then extracting lithium from the rocks. The process is very expensive and most of such mines are no longer operating.

The current processes for extraction of lithium from brines in California and in Chile employ brine evaporation and chemical fractionation to obtain a lithium concentrate. The lithium concentrate is processed in a refinery to produce a pure lithium compound such as lithium chloride or lithium carbonate.

The process utilizes chemical fractional crystallization, and has been used in California and Chile because the concentrations of the major ions in the brines, such as $Mg^{++}$, $K^+$, and $Na^+$ are not high. The brines of the Clayton Valley, Calif. have a chemical composition typified by the following:

| mg/l | | | | | | | |
|---|---|---|---|---|---|---|---|
| Ca | Mg | Na | K | Li | Cl | $SO_4$ | $HCO_3$ |
| 420 | 190 | 6500 | 400 | 23 | 11000 | 460 | 930 |

In recovering lithium from the Clayton Valley underground brines are pumped into evaporating ponds, where calcium carbonate and calcium sulfate are almost totally precipitated and sodium chloride, potassium chloride and magnesium chloride are partially precipitated through chemical reaction with reagents. The residual effluent is a lithium concentrate which has a large enough volume to be separated from the precipitates in the harvest pond. The final product at Clayton Valley, after processing, is pure lithium carbonate.

In arid regions such as the Qaidam Basin of China or the Dead Sea, the brines are primarily chloride brines. After the exploitation of potash salts through fractional crystallization, the waste brine is almost a pure solution of magnesium chloride containing a minor amount of lithium, boron, bromine, iodine, and other minor constituents.

Minor constituents in these brines are present in such low concentrations that they cannot be separated from the major constituent, magnesium chloride by a single fractionation step. The Mg/Li ratio in Qaidam Basin or Dead Sea brines is typically in the order of 1000 to 1. To economically recover a trace element such as lithium from such brines, the ions of the desired element must reach a sufficiently high concentration. To obtain such high concentration, a substantial volume of brine is evaporated almost to dryness. The volume of the residual liquid which is enriched is too low to be separated from the salt mass precipitated from a simple progressive evaporation. Consequently, minor constituents are commonly trapped in the crystal matrix of other salts or occur as impurities in such salts. Heretofore, lithium was recovered by removal of magnesium from brines by chemical reaction with other salts, such as calcium oxide. This method is not economical if the amount of magnesium to be removed is too large because of the cost involved. Since minor elements such as lithium could not be practically recovered, and the major residual element, magnesium, could not be economically recovered, the residual brines left over from potassium recovery at sites such as the Qaidam Basin were commonly discarded as waste. Residual brines from the Dead Sea were utilized for recovery of magnesium and bromine, but not lithium.

Theoretically, minor salts, such as lithium, bromine, iodine, boron and the like will finally precipitate after the precipitation of major salts when this concentration also exceeds the equilibrium value. In a brine containing magnesium, sodium, and potassium chloride as major constituents, the ionic concentration of those constituents is hundreds or thousands times more than the minor constituents such as lithium, bromine, iodine, boron and the like. When the brine is evaporated, the major constituents in the brine will first be precipitated as one or more salts. From chloride brines, bromine and iodine could be occluded in the chloride crystals as a solid-solution. Some minor constituents such as lithium will, however, remain in solution until the concentration is sufficiently high to precipitate out, e.g., as lithium chloride. Experiments have shown that lithium will not precipitate until the ratio of major ions, such as magnesium, to lithium in chloride solutions, will be close to unity. Lithium will thus remain in solution and will only precipitate from solution when it is highly concentrated.

Until now, a lithium concentrate could not be obtained by current methods from brines such as those from the Dead Sea or from the Qaidam Basin because those brines have excessively high concentrations of major ions, particularly magnesium chloride.

The composition of typical brines from Charhan Lake in the Qaidam Basin, for example, in contrast to that of Clayton Valley brine from which recovery of lithium is possible with the existing methods, as expressed in milligrams per liter is:

|  | Ca | Mg | Na | K | Li | Cl | SO$_4$ | HCO$_3$ |
|---|---|---|---|---|---|---|---|---|
| Clayton Valley | 420 | 190 | 6500 | 400 | 23 | 11000 | 460 | 930 |
| Qaidam (orig.) | minor | 57890 | 29050 | 14910 | 13 | 228590 | minor | minor |
| Qaidam (residue after Carnallite ppt.) | minor | 122010 | 1220 | 293 | 133 | 359470 | minor | minor |

The precipitation of major salts will cause enrichment of some soluble minor constituents. When a brine saturated with a major ionic component, e.g. magnesium, is evaporated to half of its water volume, supersaturation causes half of that major ionic component to be precipitated. Consequently the major ionic concentration remains about the same at the saturation value. At the same time, a soluble minor constituent such as lithium would remain unsaturated despite the water loss, its concentration in this second stage of residual solution thus being doubled. When that brine still has a large enough volume in a liquid/solid mixture, it can be removed from the precipitated salt by physical separation, e.g. draining or pumping, and introduced into another evaporating pond, to be evaporated to half of its water volume again. The major ion concentration still remains about the same at its saturation value, and the concentration of a soluble minor constituent would, in a third stage of evaporation, be quadrupled. If this stepwise fractionation by a factor of 2 is repeated 10 times, the concentration of a soluble minor constituent such as lithium could be increased $2^{10}$ or 1024 times. If a stepwise fractionation by a factor of 3 is repeated 5 times, the concentration of a soluble minor constituent could be increased $3^5$ or 243 times. The concentrate of such a minor constituent could then be refined by chemical processes in in-situ reactors such as described in co-pending application, Ser. No. 08/403,364, filed Mar. 14, 1995, or in a refinery.

Using the current commercial practices to extract lithium chloride concentrate from brines, the amount of magnesium chloride precipitated from Qaidam Basin brines is 30 to 60 times greater than that precipitated from California brines. The residual solution enriched in lithium from Qaidam brines thus has such a small volume compared to the bulk of the precipitate that the enriched lithium brine cannot be easily separated from the salt precipitates. If the brine is evaporated to dryness, the lithium becomes an impurity at a magnesium chloride concentration of about 0.1% or less. It is not economical to extract lithium from a mixture of such low concentration. Therefore, neither the lake brines, nor the brines remaining after potash recovery from Qaidam can be used for lithium recovery. The brines remaining after potash recovery from Dead Sea brines are presently processed to recover magnesium and bromine, but not lithium.

To make one liter of lithium chloride brine-concentrate that has a magnesium/lithium ratio of 10 or less and contains 10 grams of lithium from Qaidam brines, the amount of magnesium chloride that has to be precipitated from that volume of Qaidam brine is more than 15,000 grams. If all the waste magnesium is precipitated in a single step, the residual solution enriched in lithium would have a very small volume compared to the bulk of the precipitate so that the lithium rich brine would remain in the pore space of magnesium chloride precipitates or it would be occluded by the crystalline material as a liquid inclusion.

Heretofore, lithium was recovered by removal of magnesium from the brines by chemical reaction with sodium carbonate or by physically evaporating the brine in stages. The chemical reaction method is not economical if the amount of magnesium to be removed is too large because of the cost of using a reagent such as sodium carbonate. Although removal of magnesium chloride in successive physical separation stages such as described in our co-pending application Ser. No. 08/503,587, provides a process superior to those of the prior art, since physical instead of chemical separation is used, the process may be more costly because it requires the use of a multiplicity of evaporative stages.

The process described in our co-pending application provides the design of an evaporation system in which the precipitate of the major constituent such as magnesium chloride is removed in successive physical separation stages. By removing the precipitate in a series of evaporating ponds, the final brine-precipitate ratio in the recovery pond is large enough for the brine enriched in the minor constituent to be separated by drainage or by pumping.

In our co-pending patent application, we described three alternative arrangements of ponds: (1) using a very large number of ponds initially and harvesting the brine enriched in the minor constituent in the last pond, (2) using very large ponds initially and harvesting the brine enriched in the minor constituent in the last, smaller pond, and (3) using a series of successive ponds of the same size containing brines with higher and higher concentration of the minor constituent to be recovered, and harvesting the brine, greatly enriched in the minor constituent, in the last pond.

It is an object of the present invention to provide for a more economic means than was heretofore available for enrichment and recovery of minor constituents in brine.

It is a further object of the present invention to improve the rate of evaporation of brine under normal conditions to provide a more economical process for recovery of lithium and other minor brine constituents.

SUMMARY OF THE INVENTION

It has now been discovered that valuable lithium products can be effectively and economically recovered from brines such as those found in the Qaidam Basin or the Dead Sea. According to the present invention, a large pond evaporator with internal partitions to provide brine flow in a boustrophedous fashion may be used in order to achieve a continuous brine feeding and harvesting process. A brine having a low concentration of a minor constituent is fed to the evaporating facility at one end is enriched many times, with the minor constituent economically harvested at the other end of the evaporating facility.

DETAILED DESCRIPTION OF THE INVENTION

Figure 1:
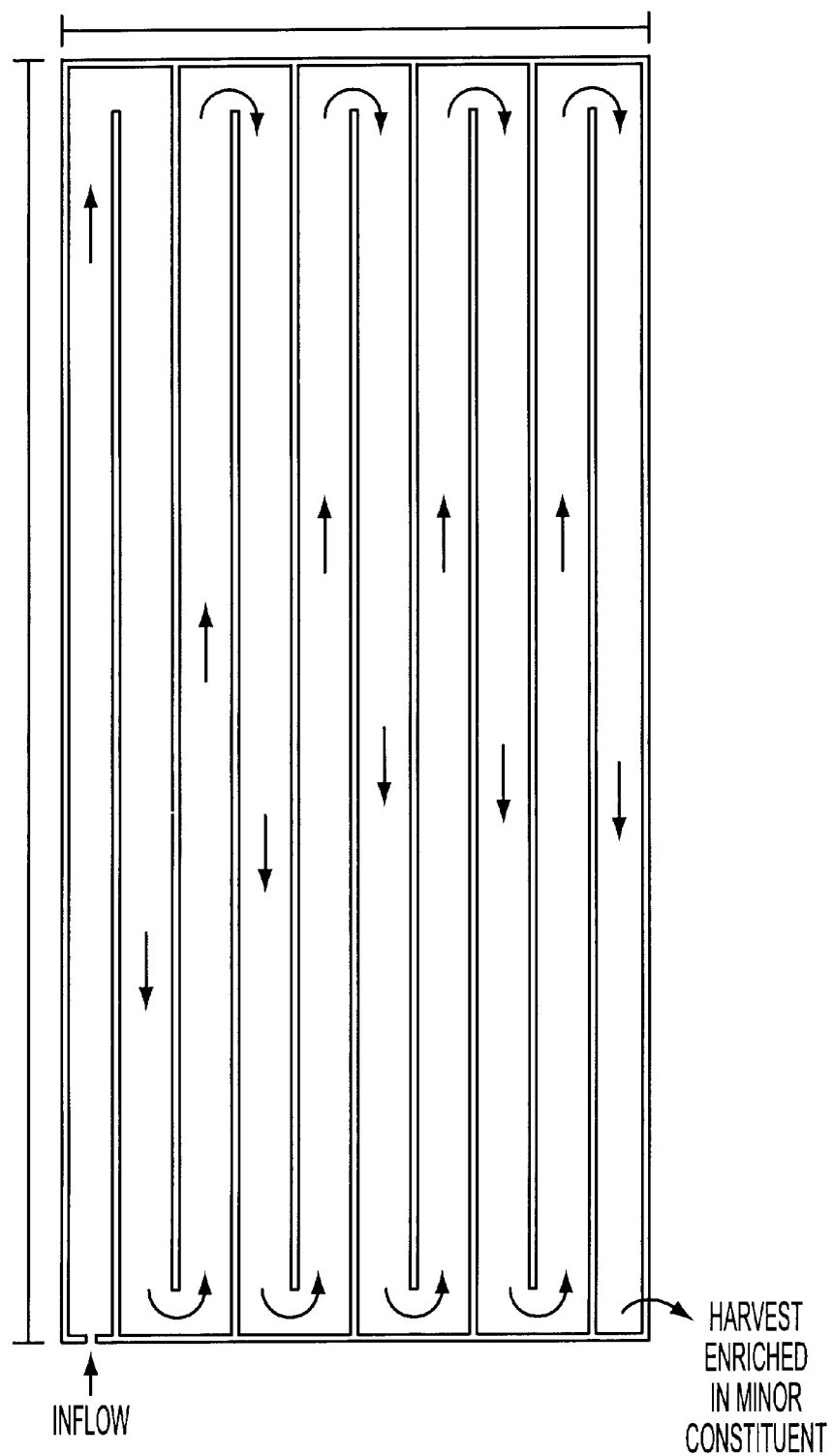
FIG. 1 is a flow chart showing the means of concentrating lithium in the Helminthoid evaporator of the present invention.

Various geometrical patterns can be used to provide the continuous feeding and harvesting means of the present invention. One convenient means is to arrange the partitions providing the boustrophedous effect in such a fashion so that brine is fed to a trough which is drained to a neighboring trough running in an opposite direction as in plowing, as shown in FIG. 1. The brine being evaporated is thus driven by the flow of fresh brine in a boustrophedous fashion through the evaporator. Since the flow pattern of the brine resembles the boustrophedous trail of fossil Helminthoid worms through mud, the evaporator of the present invention is referred to as a Helminthoid evaporator.

Another suitable means to obtain the desired economic recovery of lithium is to arrange the evaporator troughs in a spiral fashion, with the fresh brine being fed in at one end of the spiral, and the brine enriched in minor constituent being harvested at the center of the spiral. Other geometrical configurations which provide for continuous feeding of the brine into the evaporator at one end and removal at the other end with concurrent harvesting of the desired enriched minor constituents could also be employed.

Amongst others, the following are advantages of the Helminthoid evaporator:

(1) Maximum utilization of space. The space problem is particularly acute problem in the Dead Sea region or in the Mohave Desert of California, where the flat land area on the side of brine body is limited by the adjacent mountains. The production of evaporation products is thus limited by the surface area available for evaporation. The Helminthoid evaporator arrangement permits the maximum utilization of the area available for brine evaporation.

(2) Maximum efficiency of brine transfer. In evaporating systems currently in use, the transfer of brines from one pond of the system often requires numerous pumps or other drainage devices. For the Helminthoid evaporator, only one pump is generally required to feed the brine, although in some cases, another pump may be used to harvest the enriched lithium brine at the other end. The movement of brine within a Helminthoid evaporator is induced by the hydrodynamic potential of the fresh brine being pumped into one end of the evaporator. A harvest pond is located at the discharge end of the evaporator from which residual brine, enriched in the minor constituent to be recovered, can be drained or pumped for further chemical processing. Where the movement of the brine is impeded for some reason, an auxiliary pump can be employed.

(3) Effective removal of the precipitate of the major constituent. In large evaporating ponds, an expensive floating vessel has to be employed to remove the precipitate from the pond. The internal partitions of a Helminthoid evaporator can be constructed in such a way to be wide enough to be accessible to persons and/or vehicles, to facilitate removal of the precipitate of the major constituent. Generally, removal is effected when a sufficient amount of salt is precipitated to fill about ⅓ or ½ of the boustrophedous troughs, or when the precipitate is hindering the movement of brine within the troughs.

(4) Effective control of the evaporation process. The concentration of the minor constituent, such as lithium, to be recovered in a Helminthoid evaporator depends upon (a) the rate of inflow of fresh brines of a certain concentration, (b) the rate of loss of water through evaporation and/or through the precipitation of a hydrous precipitate of a major constituent, such as bischoffite ($MgCl_2 . 6H_2O$), (c) the rate of removal of the brine enriched in the minor constituent from the harvest pond, or the last trough of the Helminthoid evaporator. The rate of water-loss, depending upon weather conditions, brine-temperature, etc., cannot be precisely controlled, but it can be measured daily. The rate of removal of the brine enriched in the minor constituent is controlled in that the brine is only removed from the discharge end of the trough when the minor constituent there has attained the prescribed concentration for harvesting. The rate of daily inflow can thus be easily calculated to replace the volume of water-loss from the brine plus the volume of the brine harvested during the previous day.

In the continuous-feeding system of separate ponds described in co-pending application, Ser. No. 08/403,364, one needs to determine, for each individual pond, the rate of inflow of brine from a preceding pond and the rate of outflow of brine to a subsequent pond. If a series of one hundred ponds is used, one has to perform one hundred times more calculations to control an effective movement through such pond system. Such calculations are troublesome and control is far more difficult in such evaporating systems.

(5) Minimum Cost of Construction. The cost of constructing a leak-proof evaporating system depends upon the size and length of retaining walls, etc. Each individual pond in a series of evaporation ponds has individual walls, but two adjacent troughs in a Helminthoid evaporator share a common partition. Also, the walls of the ponds need to be leak-proof so that enriched lithium brine is not lost to groundwater. The partitions between the troughs in a Helminthoid Evaporator do not have to be completely leak-proof. Since lithium-rich brine will only leak from one trough to an adjacent trough in a Helminthoid evaporator, it is only necessary to limit the loss of lithium to the surrounding groundwater water by providing a bottom to the trough.

Although the Helminthoid evaporator is designed for brine-concentration by the use of solar energy, the same principle could be applied to construct the following two additional types of evaporating systems:

(A) A Helminthoid evaporator using solar energy to evaporate brine at elevated temperature where the brine is initially heated by thermal energy from a heating system.

(B) A Helminthoid evaporator using only thermal energy generated by burning of fuel, or derived from other non-solar sources.

Under the conditions prevailing in arid regions such as the Qaidam Basin, such heating system is not necessary, if a sufficient surface area is available. Where the area available is so limited as to necessitate utilizing an accelerated evaporation system, a heating system can be utilized to supplement solar energy as the heat required for evaporation.

Where fuel is inexpensive, a system could be designed according to the principles of the Helminthoid evaporator to recover valuable minor constituents, such as lithium, not only from brines, but also from normal seawater.

It has been found that the evaporation rate of brines is considerably less than that of fresh water. As noted in co-pending application, Ser. No. 08/403,364, the annual net evaporation of fresh water in the Qaidam region is about 3,000 mm per year. It has also been found that the annual net evaporation of brine saturated with $MgCl_2$ is only about 650 mm per year, or about 2 mm per day during the nine warmer months in the Qaidam region. Fortunately, the precipitation of a major constituent as a hydrous mineral such as magnesium chloride as bischoffite ($MgCl_2 . 6H_2O$) also removes water from brines, the rate of removal being that about twice that of the rate of water simultaneously lost to the air by evaporation by evaporation. For a daily water loss of about 2 mm as a result of brine-evaporation, the water hydrated as crystalline-water in bischoffite plus the magnesium chloride would cause the brine level in the trough to drop another 3–4 mm. In a trough which is 30 cm deep, the volume decrease of the brine would thus be about 1/60 of the original volume. The rate of evaporation can be greatly increased if the brine in the evaporator is heated to a temperature of 60° C.

The rate of removal during cold winter months could be comparable to, or even greater than the rate of removal at other times of the year when a major constituent such as $MgCl_2 \cdot 8H_2O$ is harvested, because solubility decreases with a decrease in temperature. This suggests that the brine-concentration process can be operated twelve months a year in cold and arid regions such as the Qaidam Basin in the winter.

The following example for harvesting lithium chloride from the discharge from magnesium chloride waste brines illustrates one embodiment of the present invention:

A Helminthoid evaporator is provided with a capacity to yield daily a volume of 100 m$^3$ of saturated MgCl$_2$ brine that has been enriched in dissolved LiCl so that the brine can be processed in a factory to produce one tone of LiCl solids. The following are the details:

(1) The volume of brine containing approximately 1% of LiCl required to produce one ton of LiCl solids is about 100 m$^3$.

(2) The volume of the brine to be harvested from the last trough of the Helminthoid evaporator will thus be about 100 m$^3$. Each trough is 100 m long, 3 m wide, and 0.33 m deep and will have a volume of 100 m$^3$.

(3) The volume of a brine with a LiCl concentration of 100 ppm, (referred to as Laolu in the Qaidam region) required to produce 100 m3 of harvest brine having a concentration of 1% LiCl would have to be 10,000 m$^3$.

(4) The volume of Laolu to be supplied to the Helminthoid evaporator is about 10,000 m$^3$.

(5) It has been found that the average daily rate of brine-loss from Laolu to the air and to the precipitation of hydrous mineral, during the warmer months, is about 5 mm or 0.005 m. This results in a drop of the brine level in the trough of about 0.005 m per day. The surface area of exposure to effect a brine loss of 10,000 m$^3$ must thus be 2,000,000 m$^2$ or 2 km$^2$.

In constructing the Helminthoid evaporator to enrich lithium in the brine, it is necessary to minimize the leaking of the brine to the surrounding groundwater. There are two ways to prevent leaking: (a) to construct the evaporator so that the brine level within the evaporator is the same as the groundwater table of the area, (b) to construct a leak-proof evaporator. The latter is preferred, but the cost of constructing a 2 km$^2$ leak-proof evaporator is not economical.

As noted, to effect a 100-fold enrichment of lithium from harvest brine, 100 times the volume of the 100 m$^3$, i.e. of 10,000 m$^3$ of Laolu has to be supplied to the evaporator daily. The evaporation is carried out in two stages. In the first stage, a 10-fold concentration requires reducing the 10,000 m$^3$ of Laolu to 1,000 m$^3$. I the second stage, a 10-fold concentration requires the reduction of only 1,000 m$^3$ of brine to 100 m$^3$. An evaporator can be constructed in two sections, a first section for the first 10 fold enrichment, and a second section for the second 10 fold enrichment of brine. In the initial stage of evaporation, before brine is substantially enriched, minor leaking from a pond does not result in a serious economic loss. For the first 10 fold lithium enrichment, boustrophedous troughs in the first section of the Helminthoid evaporator are constructed in such a way that the leaking of brine is minimized, but not completely eliminated. A substantially leak-proof second section is much smaller and is used for the second 10 fold lithium enrichment.

a) The first section of the Helminthoid evaporator has a total surface area of 1,800,000 m$^2$ and is more than 0.33 m deep. The total volume of the brine that can be held in the first section of the evaporator is about 600,000 m$^3$. The section is divided by partitions into 180 troughs, each of which is 1,000 long and 10 m wide. Each of the troughs can thus hold a brine volume of 3300 m$^3$. The troughs are arranged adjacent to each other as shown in FIG. 1 so that brine can move continuously from one trough to the next in a boustrophedous fashion.

The first section of Helminthoid evaporator can be constructed on the site of a brine lake, using magnesium-chloride salt, which is a waste product from potash recovery in arid regions, as the material to cement the bottom, the walls, and the partitions. The troughs are constructed so that each trough is deep enough to hold a body of brine with its surface level of about 33 cm above the trough-bottom. The inflow of brine is regulated to replace evaporative loss so that the brine level always remains the same as the groundwater table of the area. The hydrodynamic potential between the brine level within the trough and surrounding groundwater table is thus negligible. Under normal circumstances, the leaking of brine into the groundwater, or the flooding of the brine from the groundwater, is negligible, especially if the pond is cemented to reduce the permeability of the bottom and retaining walls. The evaporator can also be lined with a black waterproof material such as PVC or black canvas to increase the rate of evaporation, if feasible. Although not required, it is preferred that the troughs have a rectangular configuration to facilitate operating the system and recovery of products.

The brine from the waste disposal reservoir is a magnesium chloride solution, containing about 150 ppm of LiCl. The brine continuously moves in a boustrophedous fashion through the 180 troughs of the Helminthoid evaporator. Bischoffite is precipitated while lithium is enriched as the brine moves forward. The rate of daily movement is determined by the daily brine-loss due to evaporation and from the volume of brine pumped out of the last trough.

The volume of brine lost daily from evaporation and from precipitation of hydrous mineral is 0.005 m×1,800,000 m$^2$, or 9,000 m$^3$ daily. The volume of brine to be pumped out of the last trough for feeding the second section of the evaporator is 1,000 m$^3$ per day. The total daily replacement of the fresh brine to be fed to the first trough at the head of the evaporator is thus 10,000 m$^3$, which can be pumped in at a rate of about 1,000 m$^3$ per hour during the 10 daylight hours. A dye marker can be introduced to trace the movement rate of the inflow-brine. Travelling at a rate of 10,000 m$^3$ per day, the original 10,000 m$^3$ of brine would flow through the 600,000 m$^3$ evaporator and reach the harvest trough after two months of travel, after having lost 9/10th of its original brine volume and depositing about 8,000 tons of bischoffite in the evaporator. The 1,000 m$^3$ of brine pumped out of the last trough is enriched 10 fold to obtain a lithium concentration of more than 0.1% contains more than 1 ton of LiCl. This brine volume is pumped into the second section of the evaporator, for further lithium-enrichment.

The process of continuous feeding and harvesting requires that the brine stays in the evaporator for at least about two months before the brine in the last trough has reached the prescribed concentration. In the event of bad weather, when the evaporation rate is insufficient, there may be a need to suspend the harvesting until the lithium-concentration in the last trough again reaches the prescribed concentration. Where it is economically feasible, it is desirable to install a heating system to provide the normal evaporation rate when climatic conditions are not favorable.

It has been observed in regions such as the Qaidam Basin that brine evaporation can be effected during the months of April to October when the brine temperature ranges up to more than 40° C. The rate of harvesting decreases when the air temperature drops in late October, but the process can again become effective in December or January, when brine loss is effected through the precipitation of hydrated magnesium chloride $MgCl_2 \cdot 8H_2O$. (b) The second section of the Helminthoid evaporator which effects another lithium enrichment, has a surface area of 200,000 $m^2$. This section of the Helminthoid evaporator also has a brine depth of 0.33 cm. The total volume of the brine in this section is about 66,000 $m^3$. The section is divided by partitions into 66 troughs, each being 500 m long and 6 m wide; each trough holding a brine volume of about 1,000 $m^3$. The partitions are arranged as shown in FIG. 1 to permit a boustrophedous movement of brine continuously through the evaporator.

In contrast to the first section of the evaporator, the second section is cemented with locally produced magnesium cement and lined with black plastic sheets so as to be leak proof. Being leak proof, the evaporator can be located above the local groundwater table.

The brine from the last trough of the first section is a magnesium chloride containing solution having more than 0.1% of dissolved LiCl and is pumped daily to the head of the second section of the evaporator. The brine also moves in a boustrophedous fashion through the 66 troughs of the second section. Bischoffite is precipitated while lithium is enriched as the brine moves forward. The daily volume of brine loss from evaporation and from precipitation of hydrous compound is 0.005 m×200,000 $m^2$ or 1,000 $m^3$ daily. The volume of brine to be pumped out from the last trough for the final processing in an in-situ reactor or in a factory is 100 $m^3$ per day. The total daily replacement of the brine from the last trough of the first section to be fed to the first trough of the second section is 1,000 $m^3$.

A dye marker can be introduced to trace the movement rate of inflow brine. Travelling at a rate of 1,000 $m^3$ per day, the balance of the original 1,000 $m^3$ brine inflow flows through the 66,000 $m^3$ evaporator and reaches the harvest trough after 66 days of travel, having lost 9/10th of its original brine volume. The brine deposits about 800 tons of bischoffite in the evaporator and enriches the lithium concentration another 10-fold. The 100 $m^3$ brine to be pumped out of the last trough now has a concentration of about 1% and contains about 1 ton of LiCl to be processed in an in-situ reactor or in a factory.

Combining the continuous feeding and harvesting features of the first and second evaporator sections requires an initial period of more than four months for the maturation of the brine in the Helminthoid evaporator. After the brine is mature, i.e., the LiCl concentration in the brine has reached the desired level and when the condition of evaporation is normal, a volume of 10,000 $m^3$ Laolu with 100–150 ppm LiCl from the waste-disposal reservoir is fed to the first trough of the first section of the evaporator daily, while a volume of 100 $m^3$ of brine with 1% LiCl, once the system is filled and is fully operational, is harvested from the last trough of the second section. When evaporation is insufficient due to poor weather conditions, there would be need to a) suspend the harvesting until the lithium-concentration in the last trough again reaches the prescribed concentration, or b) to effect accelerated evaporation through a heating system.

After the brine enriched in lithium is pumped out, it can be temporarily stored in a storage reservoir of suitable dimensions. The brine is a saturated solution of magnesium chloride, containing about 1% of LiCl. The magnesium chloride can be reacted with the addition of calcium oxide and be precipitated as magnesium hydroxide. The magnesium hydroxide is the raw material for magnesium cement which is marketable. The excess calcium now present in the brine can be precipitated as calcium sulphate through the addition of sulphuric acid. This separation process can be effected in an in-situ reactor as described in co-pending Ser. No. 08/403,364 or in a factory so that the final product is a pure lithium chloride which can be dried for sale.

Although the present invention has been described with reference to various embodiments, it is to be understood that modifications and variations may be resorted to without departing from the scope of the invention, reference being had to the appended claims for a full definition of the scope of the invention.

What is claimed is:

1. A process for recovering a soluble minor constituent containing lithium from brines having soluble major constituents and a minor constituent containing lithium, by solar evaporation which comprises separating the soluble major brine constituents from the soluble minor brine constituent containing lithium by partially evaporating the brine in a continuously feeding evaporator comprising a continuous Helminthoid evaporator trough, said soluble major brine constituents being removed from said evaporator by steady state precipitation from said brine continuously moving through said evaporator, thereby enriching lithium which remains dissolved in the moving brine.

2. A process according to claim 1 which comprises accelerating the rate of evaporation by use of a heating system to increase the temperature of the brine being evaporated.

3. A continuous Helminthoid evaporator for recovering lithium from brine having major constituents and a minor constituent containing lithium comprising a Helminthoid evaporator having evaporative capability with a feed end and a discharge end and at least one continuous, essentially planar trough and means for continuously moving said brine from said feed end to said discharge end whereby water and soluble major constituents are first removed from said brine prior to recovery of lithium.

4. The evaporator of claim 3 wherein said at least one continuous essentially planar trough is arranged in a circular spiral.

5. The evaporator of claim 3 wherein said at least one continuous, essentially planar trough is comprised of a series of interconnected troughs.

6. The evaporator of claim 5 wherein said troughs being arranged adjacent to each other and interconnected at the ends of each pair of said adjacent troughs to permit the flow of brine through the entire series of troughs in a boustrophedous manner.

7. The evaporator of claim 3 wherein said brine is bitterns brine and lithium is recovered from said bitterns brine.

* * * * *